J. BILLITER.
APPARATUS FOR THE ELECTROLYSIS OF SALT SOLUTIONS.
APPLICATION FILED MAR. 30, 1912.

1,054,497.

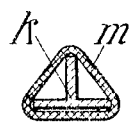
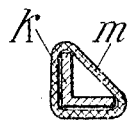
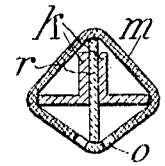
Fig. 3. Fig. 4. Fig. 5.
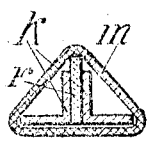
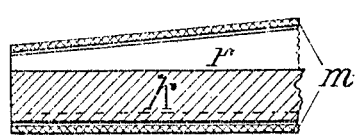
Fig. 6. Fig. 6a.
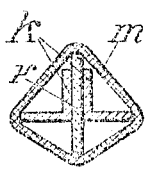
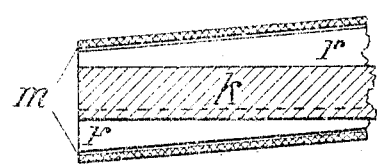
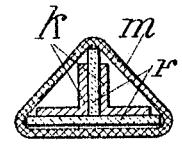
Fig. 7. Fig. 7a. Fig. 8.
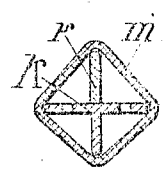
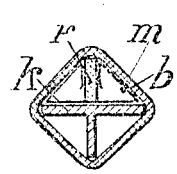
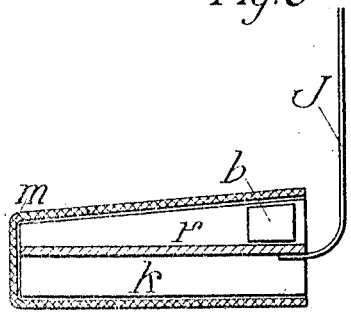
Fig. 9. Fig. 10. Fig. 10a.
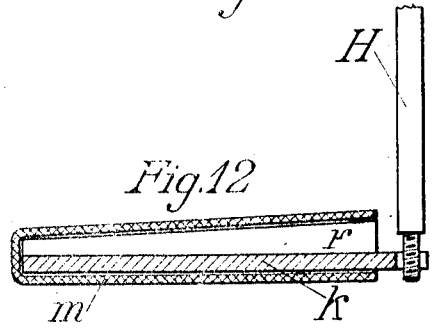
Fig. 11. Fig. 12.

UNITED STATES PATENT OFFICE.

JEAN BILLITER, OF VIENNA, AUSTRIA-HUNGARY.

APPARATUS FOR THE ELECTROLYSIS OF SALT SOLUTIONS.

1,054,497. Specification of Letters Patent. Patented Feb. 25, 1913.

Application filed March 30, 1912. Serial No. 687,524.

*To all whom it may concern:*

Be it known that I, JEAN BILLITER, a subject of the Emperor of Austria-Hungary, residing at 16 Pelikangasse, Vienna, in the Empire of Austria-Hungary, have invented certain new and useful Improvements in or Relating to Apparatus for the Electrolysis of Salt Solutions, of which the following is a specification.

In my patent application Serial No. 571,003 patented September 3, 1912, as No. 1,037,585, I have already described cells in which cathodes having the shape of bars or strips and covered with gas screens or surrounded by tubes, are arranged beneath the anode in an almost horizontal position. The liquid circulates almost completely or to the greater part between the cathode bars in a direction essentially vertical to the cathodes.

It has been found as advantageous, to vary the arrangement of the electrolyzing cell and of the cathodes described in the application cited, in such a manner that it becomes possible to conduct the soda lye at least partly past the cathodes without any noxious lateral movements of the electrolyte in the electrolyzing chamber and disturbances in the stratification being caused thereby. This affords the advantage that the lye flowing from the electrolyzing chamber has the same concentration as in the neighborhood of the cathodes and that besides the possibly still contained hypochlorite or chlorate is reduced.

The present invention further has the object of admitting of using impure salt, as provision is made for removing the mud produced.

Lastly the electrolyzer according to the present invention is of more practical shape, simplifying its construction and its use.

The accompanying drawings illustrate by way of example several constructional forms of the invention.

Figure 1:
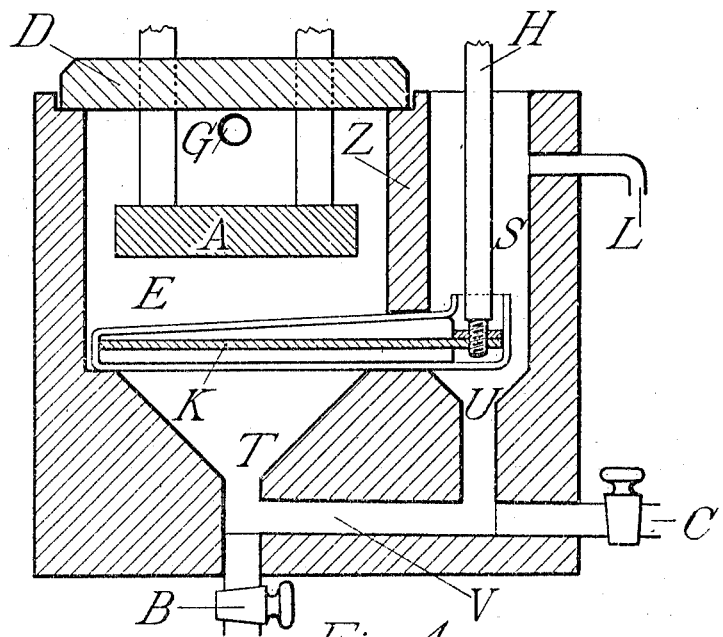
Figure 2:
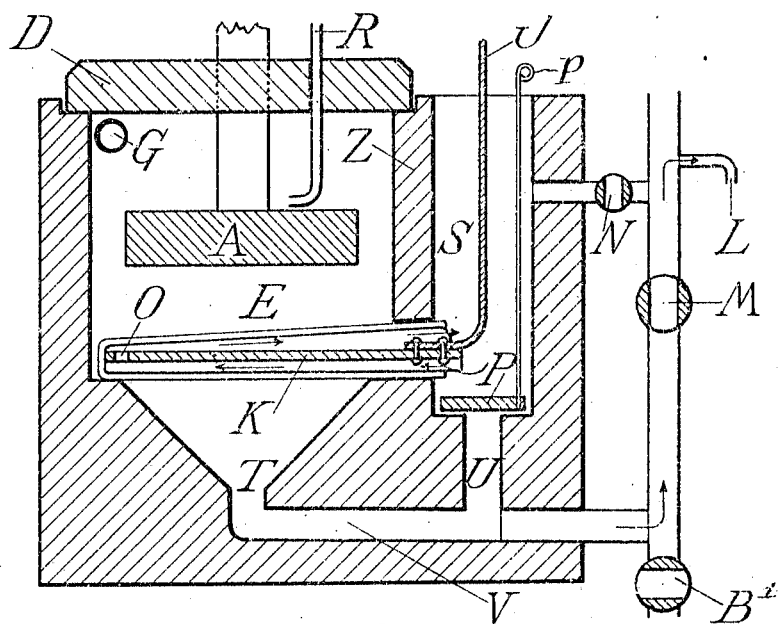

Figure 1 shows a vertical section through an electrolyzing cell according to my invention. Fig. 2 is a similar section through a modified form of the cell. Figs. 3–12 are vertical and longitudinal sections through different forms of the cathode as employed with my invention, Fig. 3 showing a cathode having a T-shape section, Fig. 4 a cathode having an angle-shape section, Fig. 5 a cathode consisting of two angle irons separated by an intermediate member and shows perforations in the under side of the screen; Fig. 6 is a cathode similar to Fig. 5, the intermediate member extending not so far downward, Fig. 6ᵃ is a sectional view of Fig. 6, Fig. 7 is a modified form of Fig. 5, the membrane being completely closed; Fig. 7ᵃ is a section through Fig. 7; Fig. 8 shows a cathode similar to Fig. 6 having a slab of insulating material under the irons. In Fig. 9 the insulating strip is arranged above the cathode. In Fig. 10 the insulating strip has a wedge-shaped form, Fig. 10ᵃ is a sectional view through Fig. 10; Fig. 11 shows an arrangement with an insulating strip consisting of two wedge-shaped parts and Fig. 12 is a section through a flat cathode consisting of two parts, the one being screwed into the other.

The bath is preferably divided by means of a partition Z, which does not extend quite down to the bottom, into the cell chamber proper E and a side chamber S (Fig. 1). The horizontally arranged anodes A are suspended in cell chamber E, and G represents the inlet to said chamber for the salt solution. The cathodes of which there is a plurality having the shape of strips are carried through the space beneath this partition. It is of advantage to fill up the space between the cathodes and the under edge of the partition with asbestos wool, sand or the like and thereby obtain a tight joint between the side chamber S and the cell chamber proper.

For facilitating the fitting of the cathodes, and obviating the necessity of removing the partition each time, they are preferably made in two sections, one horizontal section K, the end of which is passed beneath the partition Z and a vertical section H, which is then screwed in the side chamber S from above into the ends of K and serves for supplying the current. Or the cathodes K are made to terminate in a flexible piece of sheet iron (for example a piece of band iron riveted on) J (Fig. 2), which forms the lead for the current. The cathodes are then easily introduced through the slit.

According to the present invention the osmotic membrane $m$, with which the cathodes are covered or enveloped is given a steep incline on both sides. It is already known to employ with cathodes which have not the form of strips, slightly inclined planes as gas screens covering the cathodes, this will, however, not prevent the gases generated from forming large gas cushions above the cathodes. Besides the mud precipitating on the membranes, will remain lying on the latter. With the subject of the present invention on the contrary the membrane is made of so steep an incline and of a gable-roof shape, so that the hydrogen will crowd in the much reduced space above the strip-shaped cathode, so that the greater part of the membrane is in contact with the liquid and not with hydrogen gas; at the same time the mud, which would otherwise precipitate on the membranes, must slip off in consequence of the steep incline of the sides.

As shown in Figs. 3 and 4 preferably inverted T-irons or angle irons are employed for making the cathodes K, and asbestos board, asbestos fabric or the like for the gas screen. The gas screens may be either completely closed tubes or tubes which are open on their underside (Fig. 5), as indicated at o. The mud which deposits on the membrane will then, in consequence of the inclined sides, slide down freely and will be removed from the cell together with the solution.

The gases generated during the electrolysis, will collect at the top and in consequence of the section of the gas screens tapering upward they cannot severely constrict or even cut off the lines of current. Nevertheless it is advisable to facilitate the escape of the electrolytically generated hydrogen by giving the ridge-line of the cathode apices a slight rise toward the side at which the hydrogen is to escape. For obtaining this object, without the distance between the cathodes and the anodes being reduced at this side, and it being necessary to incline the anode or the cathode, it is preferable to give the membrane only the necessary rise, while the cathode remains horizontal. This can be preferably obtained by the cathodes being made, as shown in Fig. 6, of two angle irons separated by an intermediate member r, the upper edge of which, as may be seen in Fig. 6ª has the necessary incline. It will also be of advantage to extend the intermediate member r in a downward direction as shown in Figs. 7 and 7ª, whereby a space is obtained beneath the cathode and within the membrane, in which space the cathode lye can collect. If this space is made to communicate with the space above the horizontal parts of the angle iron, for example by holes (o in Fig. 2) or by recesses in the horizontal parts of the angle iron, the bubbles of hydrogen rising within the membrane will produce a circulation within the membrane, by which the escape of the hydrogen will be promoted on the one hand, while on the other a perfect compensation of the concentration within the membrane will be obtained what will be found to be of great advantage. This circulation can at the same time be utilized for obtaining a compensation of concentration between the lye in the tubes and the lye in the side chamber, if both the upper spaces and the lower spaces of the cathode constructed for example according to Fig. 7 are made to communicate with the side chamber (see Fig. 2). The intermediate members r are preferably made of insulating materials such as glass, cement, slate, porcelain and the like. If a slab of insulating material is provided, according to Fig. 8, also under the cathode, the gas screen may also be made of fine-meshed wire-netting.

For preventing the tubes, which surround the cathodes, from being bulged out or moved by the gas bubbles passing along them (whereby the stratification of the electrolyte may be impaired) the tubes must be suitably reinforced. This is obtained in the most simple manner by giving the tubes suitable stiffness. This may be obtained in a sufficient manner in tightening the membrane of which the tubes are composed. This tightening may be done in any suitable manner, it will be best and simplest to make the insulating strip r (Figs. 10 and 10ª) of a wedge shape and to insert it into the tube. Two wedges may also be employed simultaneously which are then introduced in opposite directions, so that even when the tightened tube is equally wide at both ends, it will nevertheless be uniformly taut all over, as shown in Fig. 11.

The circulation of the lye (by its being conducted along the cathode surfaces) may be insured in different ways: so, for example, the cathode lye may be drawn from the side chamber S at one or several points through the pipe L, without a communication existing between the side chamber and the cell chamber. When the cathodes are surrounded by tubes, these gas screens composed of tubes will act as extremely permeable diaphragms. If, on the contrary, the cathodes are covered with permeable or impermeable gas screens open below (Fig. 5) the solution will flow below the cathode into the side chamber. As these gas screens are open below, but closed at the sides, as described, any lateral displacement at the cathodes cannot be communicated to the contents of the cell and therefore affect the stratification. Both when open gutters and when closed tubes are used the coarse particles of the magnesia or lime mud will sink down to the bottom through the spaces between the cathode bars and may there be removed from time to time through a door in the bottom, for example, at B or C (respectively B' in Fig. 2). By this means clear cathode lyes will be obtained the concentration of which will be about the same as at the cathodes. With this kind of circulation (by use of closed tubes as a gas screen) there is indeed the danger, that the fine portions of the mud will settle in the pores of these tubes surrounding the cathodes, choke them and thus prevent the circulation. This danger does not exist and the mud will run off more easily when the cathodes are covered by inverted gutters. In this case indeed the fluctuations of the liquid level caused in the side chamber S will more easily be communicated to the contents of the cell. However, with this kind of circulation the mud may then be drawn from the cell together with the cathode lye without the level fluctuations being communicated to the interior of the cell, by the cathode being surrounded by tubes perforated in their lower portions at certain points only.

If cathodes are employed with which the rising hydrogen bubbles produce a circulation of the lye in the cathode tubes, this circulation will on the one side suck solution through the holes on the underside of the cathodes and convey it into the side chamber, from where it may be drawn off; on the other side solution is forced out of the tube in a downward direction. Also in this case the circulation will be such, that the solution is first conducted downward between the cathodes in a direction essentially vertical to the cathodes, but not quite down to the bottom of the cell. Shortly beneath the cathodes or the gas screens it will on the contrary be drawn through the openings in the cathode tubes or the gutters upward into the gutters and then to the side, without being able to impair the stratification. Indeed, with all the circulations hitherto described only a part of the mud deposited is removed from the cell, another part will fall through the space between the electrodes to the bottom and remain in the cell. It is therefore much better to let the solution flow exclusively or to the greater part through the spaces between the cathodes vertically downward but to besides conduct them through a tube U into the side chamber S before it is drawn from the latter as shown in Fig. 1. This affords the advantage that the lye drawn off has the same concentration as the lye in the cathode tubes; then that the lye is again conducted past the cathodes the trace of hypochlorite, still contained, being easily reduced at the cathode, and lastly that the mud is removed from the cell, which sinks down between the cathodes. The membranes will then not act as diaphragms and can therefore not be choked by the mud. With this kind of circulation it is advisable to surround only the horizontal part of the cathodes with the tubes or to let the tubes terminate at least shortly above the horizontal part. Then it will be possible for the electrolyte to flow from the side chamber S into the cathode tubes and emerge again at the top with the hydrogen bubbles, so that the solution circulates in a single tube only. This is particularly advantageous when the tubes are closed below, as the concentration of the caustic soda in the tube will rise a little higher than in S and the hydrogen bubbles are more easily carried off (Fig. 2). A modification of this circulation is shown in Fig. 2. The circulation will here occur in the same manner as described in the patent application Serial Number 571,003, only the outlet pipe V communicates by means of one or several passages U with the side chamber S. The concentration in the outlet pipe V and the side chamber S are compensated by these communicating passages.

When the chlorin gas or hydrogen gas generated is sucked off in an irregular manner, or when the atmospheric pressure varies greatly (in stormy weather) it may occur, that in the apparatus constructed on the bell principle the electrolyte begins to oscillate between the cell chamber E and the side chamber S, in consequence of the fluctuations of the pressure in the gas chamber, the level of the electrolyte alternately rising in E and simultaneously falling in S and vice versa. In order to avoid such fluctuations of the level which would affect the stratification dampers are arranged between the chamber E and the chamber S, which will damp such oscillations. This is done in the most simple manner for instance by the communicating passage U between E and S being closed by means of a plate which does not fit quite tightly and which may have also perforations, or also by means of a screen, a net or the like, so that nevertheless the concentration between S and U and between S and T will be compensated. Preferably this damper is made adjustable, for example by this plate P being made movable and adjustable by a wire $p$ so that the width of the communicating passages between S and U can be regulated or temporarily varied at will. Such dampers may also just as well be arranged in the passages U or V or also in the funnel or trough shaped bottom T of the cell chamber E. In case of requirement such dampers may also be arranged where the cathode tubes enter into the side chamber S. This affords the advantage, that simultaneously also the escape of the hydrogen can be so regulated, that this gas will not escape intermittently but uniformly and continuously, then neither any noxious movements of the membrane can be caused by the above described oscillations of the liquid. The reference letters M and N designate the cocks.

It is of particular advantage to arrange such dampers close to where the gas screens enter into the side chamber S, when these screens are entirely or partly open at their underside, as hereby the velocity, with which the gas escapes from the gas screens, is regulated so that it does not escape by pushes. The arrangement of such dampers in the communication S—U—V—T could of course not prevent all oscillations.

I claim:

1. An apparatus for the electrolysis of salt solutions comprising a vessel having an electrolyzing chamber and a side chamber, horizontally arranged anodes and horizontal cathodes having the shape of strips beneath said anodes, an inlet for the salt solution to the electrolyzing chamber, an outlet for the lye from the electrolyzing chamber beneath the cathode through the bottom of the electrolyzing chamber, and a circulating passage between the electrolyzing chamber and the side chamber, consisting of a passage which leads from the opening in the bottom of the electrolyzing chamber into the side chamber and an outlet pipe for the lye connected to said passage.

2. An apparatus for the electrolysis of salt solutions comprising a vessel having an electrolyzing chamber and a side chamber, horizontally arranged anodes and cathodes having the shape of strips beneath said anodes, an inlet for the salt solution to the electrolyzing chamber, an outlet for the lye from the electrolyzing chamber beneath the cathode through the bottom of the electrolyzing chamber, and a circulating passage between the electrolyzing chamber and the side chamber, tubes serving as gas screens, inclosing the cathodes and opening into the side chamber, and circulating apertures between the interior of said tubes and the side chamber.

3. An apparatus for the electrolysis of salt solutions comprising a vessel having an electrolyzing chamber and a side chamber, horizontally arranged anodes and horizontal cathodes having the shape of strips beneath said anodes, an inlet for the salt solution to the electrolyzing chamber, an outlet for the lye from the electrolyzing chamber beneath the cathode through the bottom of the electrolyzing chamber, and a circulating passage between the electrolyzing chamber and the side chamber, closed tubes leading into the side chamber and serving as gas screens, said tubes surrounding the cathodes on all sides, but having in their underside circulation holes.

4. An apparatus for the electrolysis of salt solutions comprising a vessel having an electrolyzing chamber and a side chamber, horizontally arranged anodes and horizontal cathodes having the shape of strips beneath said anodes, an inlet for the salt solution to the electrolyzing chamber, an outlet for the lye from the electrolyzing chamber beneath the cathode through the bottom of the electrolyzing chamber, and a circulating passage between the electrolyzing chamber and the side chamber, gas screens leading into the side chamber and surrounding the cathodes, their sides having a steep incline.

5. An apparatus for the electrolysis of salt solutions comprising a vessel having an electrolyzing chamber and a side chamber, horizontally arranged anodes and horizontal cathodes having the shape of strips beneath said anodes, an inlet for the salt solution to the electrolyzing chamber, an outlet for the lye from the electrolyzing chamber beneath the cathode through the bottom of the electrolyzing chamber and a circulating passage between the electrolyzing chamber and the side chamber, closed tubes leading into the side chamber and serving as gas screens, said tubes surrounding the cathodes on all sides, but having in their underside circulation holes to the side chamber and so arranged that the ridge line is slightly inclined to the horizontal line.

6. An apparatus for the electrolysis of salt solutions comprising a vessel having an electrolyzing chamber, horizontally arranged anodes, cathodes having the shape of strips beneath said anodes and gas screens inclosing each cathode element, the cathodes being provided with bars made of insulating material, the upper ridge of which is slightly inclined to facilitate the escape of the gas bubbles.

7. An apparatus for the electrolysis of salt solutions comprising a vessel having an electrolyzing chamber, horizontally arranged anodes, cathodes having the shape of strips beneath said anodes and gas screens inclosing each cathode element, the cathodes being provided with bars made of insulating material, the upper ridge of which is slightly inclined to facilitate the escape of the gas bubbles, above the cathode.

8. An apparatus for the electrolysis of salt solutions comprising a vessel having an electrolyzing chamber, horizontally arranged anodes, cathodes having the shape of strips beneath said anodes and gas screens inclosing each cathode element, the cathodes being provided with bars made of insulating material, the upper ridge of which is slightly inclined to facilitate the escape of the gas bubbles above the cathodes, the spaces within the membrane above and below the cathode communicating through holes, adapted to produce a circulation of the electrolyte within the screen.

9. An apparatus for the electrolysis of salt solutions comprising a vessel having an electrolyzing chamber, horizontally arranged anodes, cathodes having the shape of strips beneath said anodes and gas screens inclosing each cathode element, the cathodes being provided with bars made of insulating material, the upper ridge of which is slightly inclined to facilitate the escape of the gas bubbles, the bars being so arranged as to insulate the cathode from the screen.

10. An apparatus for the electrolysis of salt solutions, comprising a vessel having an electrolyzing chamber, horizontally arranged anodes, cathodes having the shape of strips beneath said anodes and gas screens, completely inclosing each cathode at the top and sides and consisting of asbestos-fabric.

11. An apparatus for the electrolysis of salt solutions, comprising a vessel having an electrolyzing chamber, horizontally arranged anodes, cathodes having the shape of strips beneath said anodes and gas screens, completely inclosing each cathode at the top and sides, said screens being tightened by means of inserted wedges.

12. An apparatus for the electrolysis of salt solutions, comprising a vessel having an electrolyzing chamber, horizontally arranged anodes, cathodes having the shape of strips beneath said anodes and gas screens, completely inclosing each cathode at the top and sides, said cathodes being made of T-shaped irons in combination with non-conductive materials for holding the gas screens.

13. An apparatus for the electrolysis of salt solutions, comprising a vessel having an electrolyzing chamber and a side chamber, horizontally arranged anodes and cathodes having the shape of strips beneath said anodes, an inlet for the salt solution to the electrolyzing chamber, an outlet for the lye from the electrolyzing chamber beneath the cathode through the bottom of the electrolyzing chamber, tubes serving as gas screens, inclosing the cathodes, a circulating passage between the electrolyzing chamber and the side chamber, and dampers in said circulating passage.

14. An apparatus for the electrolysis of salt solutions, comprising a vessel having an electrolyzing chamber and a side chamber, horizontally arranged anodes and cathodes having the shape of strips beneath said anodes, an inlet for the salt solution to the electrolyzing chamber, an outlet for the lye from the electrolyzing chamber beneath the cathodes through the bottom of the electrolyzing chamber, tubes serving as gas screens, inclosing the cathodes and leading into the side chamber and forming a circulation passage for the lye, extending from the side chamber through the space beneath the cathode inclosed by said tube, through the openings in the cathodes, into the space above the cathode inclosed by the tube and back into the side chamber, and a circulating passage between the lower part of the electrolyzing chamber and the side chamber.

15. An apparatus for the electrolysis of salt solutions, comprising a vessel having an electrolyzing chamber and a side chamber, horizontally arranged anodes and cathodes having the shape of strips beneath said anodes, an inlet for the salt solution to the electrolyzing chamber, an outlet for the lye from the electrolyzing chamber beneath the cathodes through the bottom of the electrolyzing chamber, tubes serving as gas screens, inclosing the cathodes and leading into the side chamber and forming a circulation passage for the lye, extending from the side chamber through the space beneath the cathode inclosed by said tube, through the openings in the cathodes, into the space above the cathode inclosed by the tube and back into the side chamber, a circulating passage between the lower part of the electrolyzing chamber and the side chamber and a damper in said circulating passage.

16. An apparatus for the electrolysis of salt solutions, comprising a vessel having an electrolyzing chamber and a side chamber, horizontally arranged anodes and cathodes having the shape of strips beneath said anodes, an inlet for the salt solution to the electrolyzing chamber, an outlet for the lye from the electrolyzing chamber beneath the cathodes through the bottom of the electrolyzing chamber, tubes serving as gas screens, inclosing the cathodes, a circulating passage between the electrolyzing chamber and the side chamber, and a damper in said circulating passage regulable at will from outside.

In testimony whereof I affix my signature in presence of two witnesses.

JEAN BILLITER.

Witnesses:
AUGUST FUGGER.
ADA MARIA BERGER.